Nov. 16, 1943.  J. KRAL  2,334,678
SEPARABLE SNAP FASTENER INSTALLATION
Filed Oct. 1, 1942

Inventor
Joseph Kral.
By Walter P. Jones
Attorney

Patented Nov. 16, 1943

2,334,678

UNITED STATES PATENT OFFICE 2,334,678

SEPARABLE SNAP FASTENER INSTALLATION

Joseph Kral, Cambridge, Mass., assignor to United-Carr Fastener Corporation, Cambridge, Mass., a corporation of Massachusetts Application October 1, 1942, Serial No. 460,377

2 Claims. (Cl. 24—222)

The present invention relates to snap fastener installations and more particularly to improved means for effecting the automatic release of the separable parts of the fastener due to relative lateral movement of the parts connected thereto.

More particularly, the invention aims to provide an improved separable fastener installation between a supporting member and a laterally movable supported member, as, for example, an automatically folding top of a motor vehicle, one part of the fastener being designed to receive and hold the cooperating fastener part when the supported member is in cooperative position relative to the support but to automatically release said cooperating fastener part upon lateral movement of the supported part away from the support.

Illustrative of my invention, reference is made to the accompanying drawing showing operative embodiments thereof, and wherein Fig. 1 is a top plan view of a fastener installation according to one embodiment of the invention;

Figure 1:
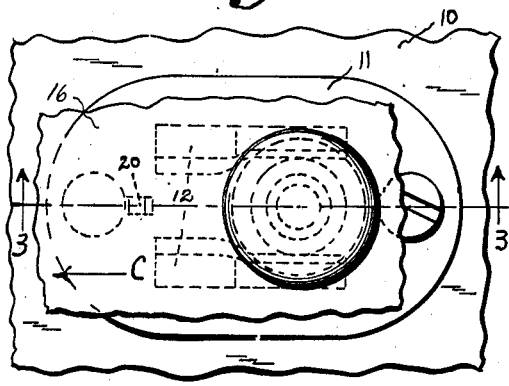
Figure 2:
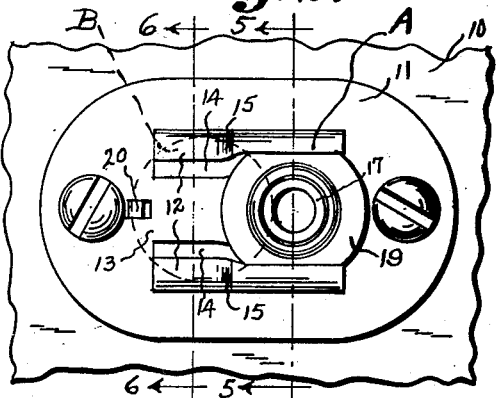
Fig. 2 is a top plan view of the stud and its mounting.
Figure 3:
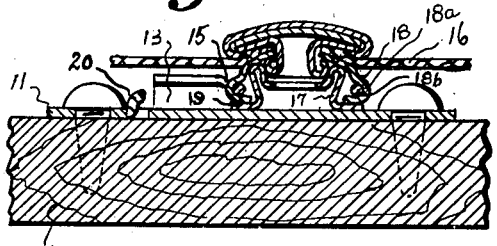
Fig. 3 is a longitudinal sectional view as taken on the line 3—3 of Fig. 1.
Figure 4:
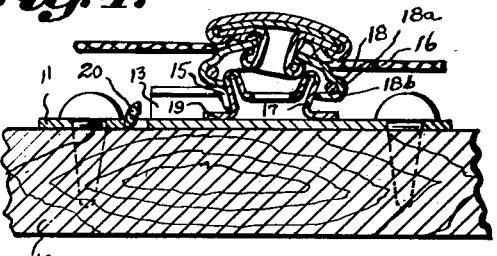
Fig. 4 is a similar view illustrating the position of the stud and socket members as they are about to be disengaged.
Figure 5:
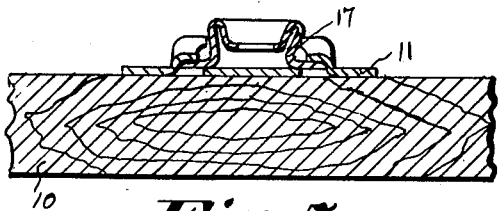
Fig. 5 is a transverse sectional view as taken on the line 5—5 of Fig. 2.
Figure 6:
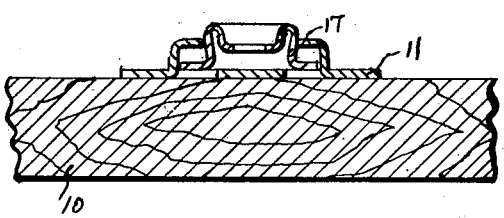
Fig. 6 is a transverse sectional view as taken on the line 6—6 of Fig. 2.

In the illustrated embodiment of the invention a suitable support 10, which may be a part of a vehicle body frame, may be formed with or have mounted thereon a slideway 11 having overhanging sides 12 forming an elongated channel-shaped guideway 13. The overhanging sides 12 may conveniently be formed integrally from slitted portions 14 of the slideway and preferably present a lower fastener-receiving position A and a raised fastener-releasing position B, the upper surface of the sides 12 being inclined between said positions to provide cam means 15 for releasing the fastener parts as will appear hereinafter.

The supported member 16 conveniently is one that is subject to movement laterally with reference to the support 10, as, for example, a flexible fabric top of a motor vehicle body which may be moved to and from fastened position with reference to the support in a direction generally indicated by the arrow C (Fig. 1). Advantageously, the longitudinal axis of the guideway 13 is disposed in the direction of movement of the supported member 16.

Suitable separable snap fastening stud and socket parts 17 and 18, respectively, are connected to the supported member 16 and guideway 13 and preferably the stud member 17 is mounted in the guideway. Conveniently the stud member is formed with a base flange 19 of larger diameter than the stud 17, which is confined in the guideway under the overhanging channel sides 12, to prevent axial displacement of the stud from the guideway.

The cooperating fastener part, preferably the socket member 18, is firmly attached and clamped to the supported part in any approved conventional manner, such socket members usually comprising a cupped shell 18$^a$ housing a split ring spring 18$^b$ for snap fastening engagement with the stud.

When the stud is in the fastener-receiving position A of the guideway 13, the adjacent channel sides 12 are sufficiently low to provide adequate room for the application of the socket member 18 thereto and locked thereon in snap fastener engagement.

When, however, the supported member 16 is subjected to a lateral pull, in the direction of the arrow C, as, for example, when the vehicle top is being lowered, the assembled stud and socket fastener parts are shifted along the guideway toward the releasing position B. As the rounded edge of the shell 18$^a$ engages the inclined or cam surface 15 of the sides 12, the socket is tilted relative to the stud to the point where the split ring spring 18$^b$ is disengaged from the stud. Further movement of the socket along the raised side portion of the position B completely separates the socket 18 from the stud.

Preferably the slideway 11 is formed with a stop member 20 to limit movement of the stud in the releasing position.

Figure 7:
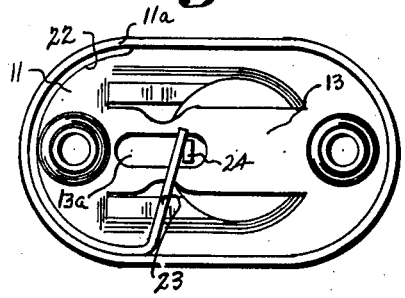
Fig. 7 is a bottom plan view of a modified form of the stud slideway.

The slideway 11 may be formed as a separate member from the support and advantageously may have depending side flanges 11$^a$ and the bottom of the guideway 13 may be slotted as at 13$^a$, see Fig. 7. The flanged sides 11$^a$ thus form a housing for a curved spring base 22 having a lateral arm 23 extending to the slot 13$^a$ and engaging the stud 17 to maintain the stud normally in position A. The stud 17 may have a depending projection 24 extending through the slot 13$^a$ and bearing against the spring arm 23 so that as the stud and socket are moved toward releasing position B the stud is placed under spring tension and disengagement of the socket from the stud permits the spring arm to return the stud to its socket-receiving position A.

While I have illustrated and described preferred embodiments of my invention, I do not wish to be limited thereby, because the scope of my invention is best defined by the following claims.

I claim:

1. A separable fastener installation comprising a support, a guideway member mounted on said support and having opposed channels, a snap fastener member slidable laterally in the channels of said guideway member, a supported member movable laterally relative to said support, a cooperating snap fastener member on said supported member and having snap fastener cooperation with said first-mentioned snap fastener member and cam means presented by the guideway members for disengaging said snap fastener members upon lateral movement of said snap fastener members and said supported member.

2. A separable fastener installation comprising a support, a guideway member mounted on said support and having opposed channels, a snap fastener member slidable laterally in the channels of said guideway member, a supported member movable laterally relative to said support, a cooperating snap fastener member on said supported member and having snap fastener cooperation with said first-mentioned snap fastener member and cam means presented by the guideway member for disengaging said snap fastener members upon lateral movement of said snap fastener members and said supported member, said guideway member being in the form of a platelike device and the said channels being formed as integral parts thereof.

JOSEPH KRAL.